April 29, 1924.

J. GREIG 1,491,908

DEVICE FOR CUTTING OFF OR FACILITATING THE REMOVAL OF THE TOPS OF EGGSHELLS

Filed July 9, 1923

Inventor
John Greig
by P. Singer
Atty

Patented Apr. 29, 1924.

1,491,908

UNITED STATES PATENT OFFICE.

JOHN GREIG, OF LONDON, ENGLAND.

DEVICE FOR CUTTING OFF OR FACILITATING THE REMOVAL OF THE TOPS OF EGGSHELLS.

Application filed July 9, 1923. Serial No. 650,553.

*To all whom it may concern:*

Be it known that I, JOHN GREIG, a subject of the King of Great Britain, residing at London, England, have invented certain new and useful Improvements in Devices for Cutting Off or Facilitating the Removal of the Tops of Eggshells, of which the following is a specification.

This invention relates to a new or improved device for cutting off or facilitating the removal of the tops of shells from eggs, and has for its object a simple device by means of which the shell may be cut through or weakened to enable the top to be easily removed by means of a knife so that the shell is not unnecessarily shattered or broken around the cut edge.

According to the invention a circular sawtooth cutting member, is provided mounted on or within or formed by a portion of a suitable holder. The teeth of the saw are adapted to engage the surface of the shell in a suitable position, towards one end of the egg and all come in a transverse plane, when the device is placed in position and by turning it backwards and forwards the teeth completely cut through or weaken the shell to enable the end of the egg to be removed by a knife or otherwise.

And in order that the invention may be better understood, it will now be described with reference to the accompanying drawing, in which Figs. 1, 2, 3 and 4 are sectional elevations of four forms of device made according to the invention.

Figure 4:
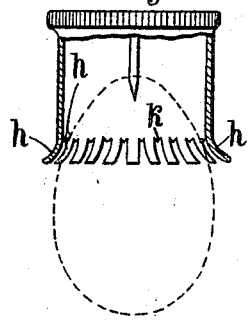
Figure 6:
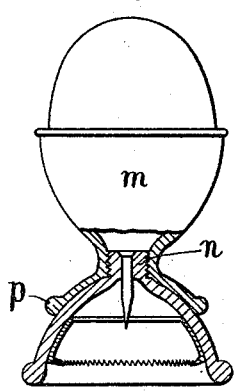
Figure 5:
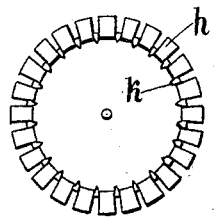

Fig. 5 an under plan of Fig. 4, and, Fig. 6 a section of a modified form.

Figure 1:
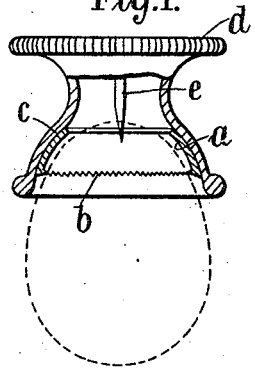

In Fig. 1, the circular cutting member consists of a band or ring $a$ of tempered steel or the like having saw like cutting teeth $b$ at one edge. These teeth are inwardly and preferably downwardly directed and the band $a$ is suitably secured to the inside of the casing or holder $c$ formed with a manipulating flange $d$ constituting a hand grip. The end of the casing with the flange is closed and carries a projecting pin or point $e$.

In use it will be seen that the device is placed over the end of the egg and the pin $e$ (which might be screw threaded and adjustable) pierces the shell; the teeth $b$ also come into contact therewith and by turning the device backwards and forwards the shell is cut or weakened.

Figure 2:
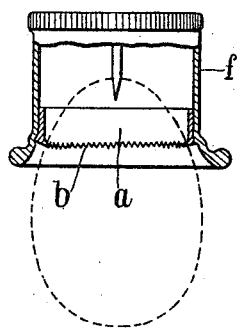
Figure 3:
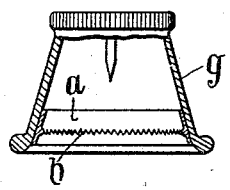

The form of the device in Fig. 2 has a cylindrical casing $f$ and in Fig. 3 the casing $g$ is conical.

The casing in Figs. 4 and 5, is formed with outwardly bent tongues $h$ with inwardly and downwardly directed teeth $k$ between; the tongues $h$ form an entering mouth and the teeth $k$ the cutting member.

In the form shown in Fig. 6 an egg cup $m$ has a female thread near the base into which a threaded portion $n$ on the cutting device is adapted to be screwed. When the cutter is thus secured to the egg-cup its open end forms the base, but when the cutter is unscrewed the portion $p$ forms the base.

The upper end of the cutting device carrying the point or pin may in some cases be left open the pin then being supported by a bridge or spider.

In some cases the cutting device may be formed at the base of a condiment container for instance the forms shown at Figs. 2, 3 and 4, would be extremely suitable to come beneath the base of a salt sprinkler or the like.

In place of the saw-member being formed as shown, in some cases it may be constituted by a number of pointed pins riveted or otherwise secured to the holder in suitable positions.

The cutting member may in some cases be made removable from the holder. In one method of carrying this into effect the cutting member is formed with a screw threaded portion adapted to engage a corresponding portion in the holder. Further the position of the cutter may be adjusted with respect to the holder for instance by suitable engaging threaded portions and a locking screw, nut or otherwise.

What I claim and desire to secure by Letters Patent in the United States of America is:—

1. A device for cutting the shells of eggs, comprising a circular holder arranged to receive the end of an egg, and a complete circle of teeth spaced a suitable distance apart and projecting inwardly, in fixed relation to and on the interior of said holder.

2. A device for cutting the shells of eggs, comprising a circular holder arranged to receive the end of an egg, a ring secured to the circular holder on the interior, and a complete circle of teeth spaced a suitable distance apart and projecting inwardly on the said ring.

3. A device for cutting the shells of eggs comprising a circular holder arranged to receive the end of an egg, a complete circle of teeth formed from turned in portions of the holder spaced a suitable distance apart and projecting into the interior of the holder.

4. A device for cutting the shells of eggs, comprising a circular holder arranged to receive the end of an egg, a centrally disposed point carried by said holder and adapted to perforate the central portion of the end of the egg, and a complete circle of teeth spaced a suitable distance apart and projecting inwardly in fixed relation to and on the interior of said holder.

5. A device for cutting the shells of eggs, comprising a circular holder arranged to receive the end of an egg, a complete circle of teeth spaced a suitable distance apart and projecting inwardly, in fixed relation to and on the interior of said holder, and an egg cup having its base portion detachably fitted on said holder so that the said holder forms a supporting base for said cup.

In witness whereof I affix my signature.

JOHN GREIG.